(12) United States Patent
Isenegger et al.

(10) Patent No.: US 11,886,348 B2
(45) Date of Patent: *Jan. 30, 2024

(54) INTERLEAVED CACHE PREFETCHING

(71) Applicant: Micron Technology, Inc., Boise, ID (US)

(72) Inventors: Laurent Isenegger, Morgan Hill, CA (US); Robert M. Walker, Raleigh, NC (US); Cagdas Dirik, Indianola, WA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/117,820

(22) Filed: Mar. 6, 2023

(65) Prior Publication Data
US 2023/0205701 A1    Jun. 29, 2023

Related U.S. Application Data

(63) Continuation of application No. 17/464,563, filed on Sep. 1, 2021, now Pat. No. 11,599,472.

(51) Int. Cl.
*G06F 3/06* (2006.01)
*G06F 12/0862* (2016.01)
*G06F 12/0831* (2016.01)

(52) U.S. Cl.
CPC .......... *G06F 12/0862* (2013.01); *G06F 3/061* (2013.01); *G06F 3/0658* (2013.01); *G06F 3/0683* (2013.01); *G06F 12/0835* (2013.01); *G06F 2212/283* (2013.01)

(58) Field of Classification Search
CPC .. G06F 12/0897; G06F 12/08; G06F 12/0811; G06F 12/0857; G06F 2212/251; G06F 2212/253; G06F 12/00; G06F 12/0875; G06F 12/0846; G06F 12/0855; G06F 9/38; G06F 21/6281; G06F 21/78; G06F 2212/1052; G06F 2221/2141; G06F 12/0804; G06F 12/0842; G06F 12/0844; G06F 12/0868; G06F 13/126; G06F 13/4282; G06F 2009/4557; G06F 2009/45595; G06F 2212/1016; G06F 2212/152; G06F 2212/217; G06F 2212/222; G06F 2212/225; G06F 2212/305; G06F 2212/313; G06F 9/45558
See application file for complete search history.

(56) References Cited

U.S. PATENT DOCUMENTS

| | | |
|---|---|---|
| 10,719,443 B2 | 7/2020 | Ramanujan |
| 2013/0185508 A1 | 7/2013 | Talagala |
| 2017/0083337 A1 | 3/2017 | Burger |

(Continued)

*Primary Examiner* — Yong J Choe
(74) *Attorney, Agent, or Firm* — Brooks, Cameron & Huebsch, PLLC

(57) ABSTRACT

A method includes receiving, at a direct memory access (DMA) controller of a memory device, a first command from a first cache controller coupled to the memory device to prefetch first data from the memory device and sending the prefetched first data, in response to receiving the first command, to a second cache controller coupled to the memory device. The method can further include receiving a second command from a second cache controller coupled to the memory device to prefetch second data from the memory device, and sending the prefetched second data, in response to receiving the second command, to a third cache controller coupled to the memory device.

20 Claims, 4 Drawing Sheets

(56) References Cited

U.S. PATENT DOCUMENTS

2017/0083338 A1   3/2017  Burger
2017/0083339 A1   3/2017  Burger
2019/0042436 A1   2/2019  Klemm

INTERLEAVED CACHE PREFETCHING

PRIORITY INFORMATION

This application is a Continuation of U.S. application Ser. No. 17/464,563, filed on Sep. 1, 2021, which will issue as U.S. Pat. No. 11,599,472 on Mar. 7, 2023, the contents of which are incorporated herein by reference.

TECHNICAL FIELD

Embodiments of the disclosure relate generally to memory sub-systems, and more specifically, relate to memory sub-system prefetching into interleaved caches.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
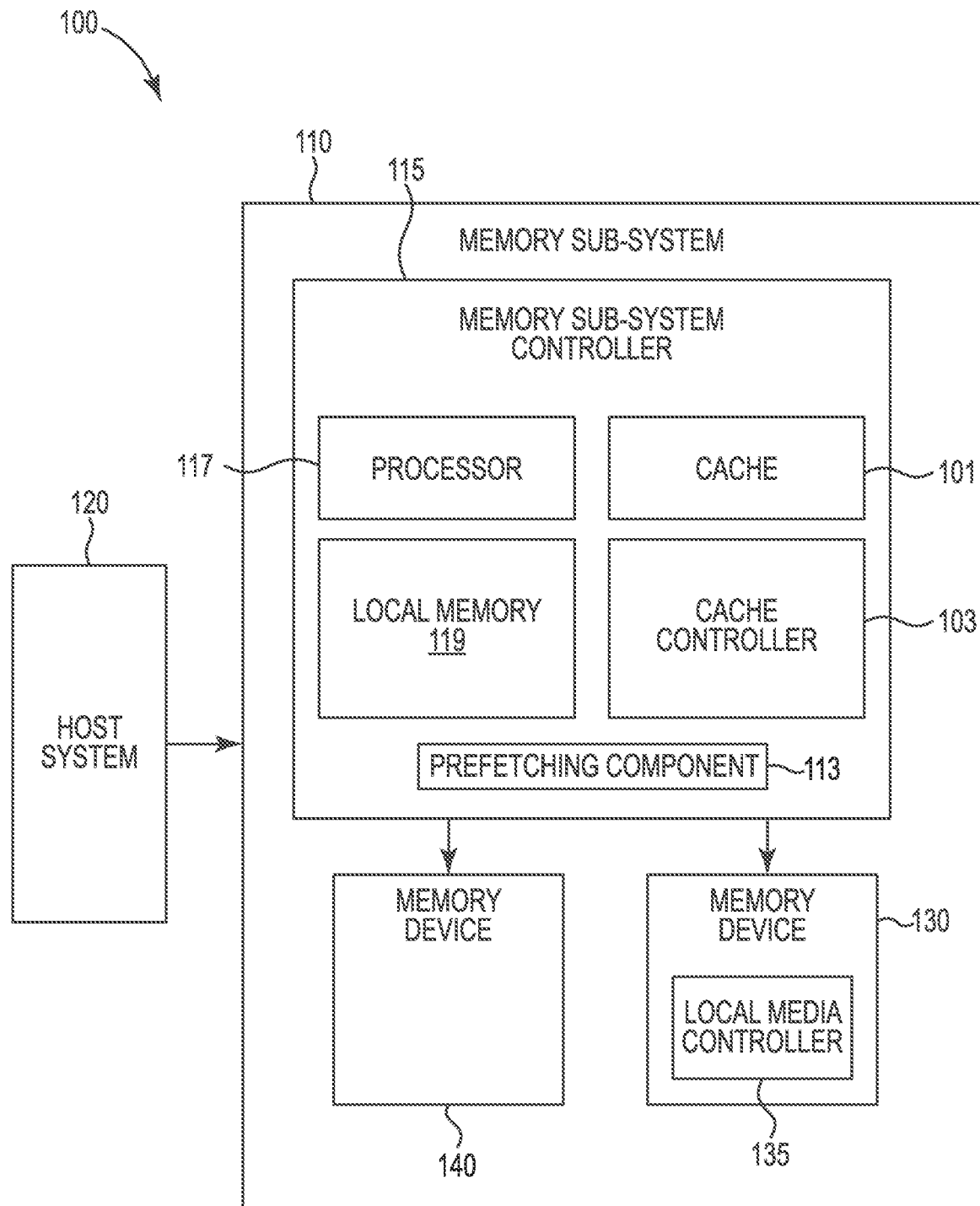
FIG. 1 illustrates an example computing system that includes a memory sub-system in accordance with some embodiments of the present disclosure.

Aspects of the present disclosure are directed to memory sub-system prefetching into interleaved caches, in particular to memory sub-systems that include a prefetching component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

Server systems can use a plurality of memory channels interleaved. The interleaving granularity dictates which channel is servicing memory requests issued by a host memory controller. For example, a 64 B interleaving granularity means that the bytes addressed from 0 to 63 are serviced by channel 0, 64 to 127 by channel 1, and so on until the last channel number is reached. After the last channel, a return to channel 0 is made. A 128 B interleaving granularity would instead allocate addresses 0 to 127 to channel 0, 128 to 255 to channel 1, etc.

Some memory technologies and interfaces allow the deployment of hybrid memory subsystems. These hybrid memory subsystems may include a cache for quick access to "hot" data and a backing store with slower data access times for "cold" data. Prefetching is a technique that allows for proactively bringing data from a backing store into a cache in anticipation of future accesses that might be requested by the host memory controller. Prefetching can improve system performance and reduce latencies.

A memory system can include cache controllers located between a host and a backing store. Each cache controller can control data movement between the associated cache and the backing store and may trigger prefetch. However, when processing sequential traffic, because of interleaving, each cache controller can only prefetch addresses associated with its associated cache, which can reduce the benefits of prefetching.

Aspects of the present disclosure address the above and other deficiencies by using a controller embedded in a memory device such as a backing store allowing for a first cache controller to trigger a prefetch into a second cache controller. For a request issued by a host memory controller, the request can be routed to the first cache controller, which can include logic that under particular conditions can trigger a prefetch from the memory device. In addition to this, the first cache controller can also send a message to the controller embedded in the memory device via a memory device interface. The message can include a source address or source addresses to be prefetched from the memory device. The controller embedded in the memory device can receive the message and initiate transfers (e.g., direct memory access (DMA) transfers) from the memory device into an appropriate cache controller. In such an example, the prefetch is not limited to the first cache controller, but the overall memory system can benefit from prefetch into other cache controllers. This can improve overall system performance by increasing cache hit rate and reducing read latency.

In some examples, the memory device can include a monitoring engine to track which addresses are being accessed by each of the cache controllers. The monitoring engine, for instance, can include logic to track past and current behavior to determine which addresses may be needed in the future. By analyzing traffic coming in from a number of cache controllers, the monitoring engine can detect access patterns and anticipate future accesses from other cache controllers, either by prefetching the data into a local, faster buffer in the memory device, or by pushing the data into another cache controller. Latency for read requests coming into the memory device can be reduced by anticipating future accesses by detecting the access patterns.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD).

Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. For instance, the memory sub-system controller 115 can include a cache 101 and a cache controller 103. For example, cache 101 can be SRAM. Memory sub-system can be configured such that memory device 130 and/or 140 can be memory mapped storage for the memory sub-system 110. Memory sub-system 110 can be configured to include cache memory for caching data stored in the memory mapped stored of the memory sub-system 110. Memory device 130, memory device 104, and/or cache 101 can be configured as cache memory for the memory sub-system 110. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a prefetching component 113. Although not shown in FIG. 1 so as to not obfuscate the drawings, the prefetching component 113 can include various circuitry to facilitate prefetch triggering for the memory sub-system and/or the components of the memory sub-system. In some embodiments, the prefetching component 113 can include special purpose circuitry in the form of an ASIC, FPGA, state machine, and/or other logic circuitry that can allow the prefetching component 113 to orchestrate and/or perform operations to selectively trigger prefetching for the memory device 130 and/or the memory device 140 based on logic inside a controller of the memory device tracking addresses and determining to push data into cache controller 103 and/or the cache controller 103 including prefetch logic and sending messages to the memory device 130 to a monitoring engine in the memory device 130 causing the memory device 130 to move the data. In some instances, the monitoring engine may be located in one or more cache controllers 103.

In some embodiments, the memory sub-system controller 115 includes at least a portion of the prefetching component 113. For example, the memory sub-system controller 115 can include a processor 117 (processing device) configured to execute instructions stored in local memory 119 for performing the operations described herein. In some embodiments, the prefetching component 113 is part of the host system 110, an application, or an operating system.

In a non-limiting example, an apparatus (e.g., the computing system 100) can include a memory sub-system prefetching component 113. The memory sub-system prefetching component 113 can be resident on the memory sub-system 110. As used herein, the term "resident on" refers to something that is physically located on a particular component. For example, the memory sub-system prefetching component 113 being "resident on" the memory sub-system 110 refers to a condition in which the hardware circuitry that comprises the memory sub-system prefetching component 113 is physically located on the memory sub-system 110. The term "resident on" can be used interchangeably with other terms such as "deployed on" or "located on," herein.

The memory sub-system prefetching component 113 can be configured to determine when to perform a prefetch operation and determine which cache device of a plurality of cache devices to send a prefetch command. A DMA controller can be configured to send the prefetched data to a cache controller 103 of the determined cache device 101. As described above, the memory components can be memory dice or memory packages that form at least a portion of the memory device 130.

The memory sub-system prefetching component 113 can be further configured to track source addresses accessed by the cache controller and detect source address access patterns based on the tracked source addresses. For example, commands can be sent to the memory device (e.g., via a number of cache controllers) for a prefetch operation. A DMA controller can send data to any one of a number of cache devices coupled to a memory device that includes the DMA controller.

In some examples, each one of the number of cache controllers can be located on an associated one of the number of cache devices, and each one of the number of cache devices can be located on an associated one of a plurality of interleaved channels between a host device and the memory device. For instance, each of the number of cache devices can be coupled to the host device and the memory device via the associated interleaved channel.

In some examples, the commands from the number of cache controllers can include a source address, and the DMA can send the data based on the source address. In other examples, the data comprises sequential data, and the number of cache controllers sends the commands in response to a request to process the sequential data.

The memory device can include a monitoring engine to track which source addresses are accessed by which of the number of cache controllers. In some examples, the monitoring engine can detect access patterns of the number of cache controllers based on the tracked source addresses and anticipate future source address access based on the detected access patterns. In such examples, the monitoring engine can prefetch associated data into a local buffer in the memory device and/or send associated data into a particular cache controller of the number of cache controllers.

Figure 2:
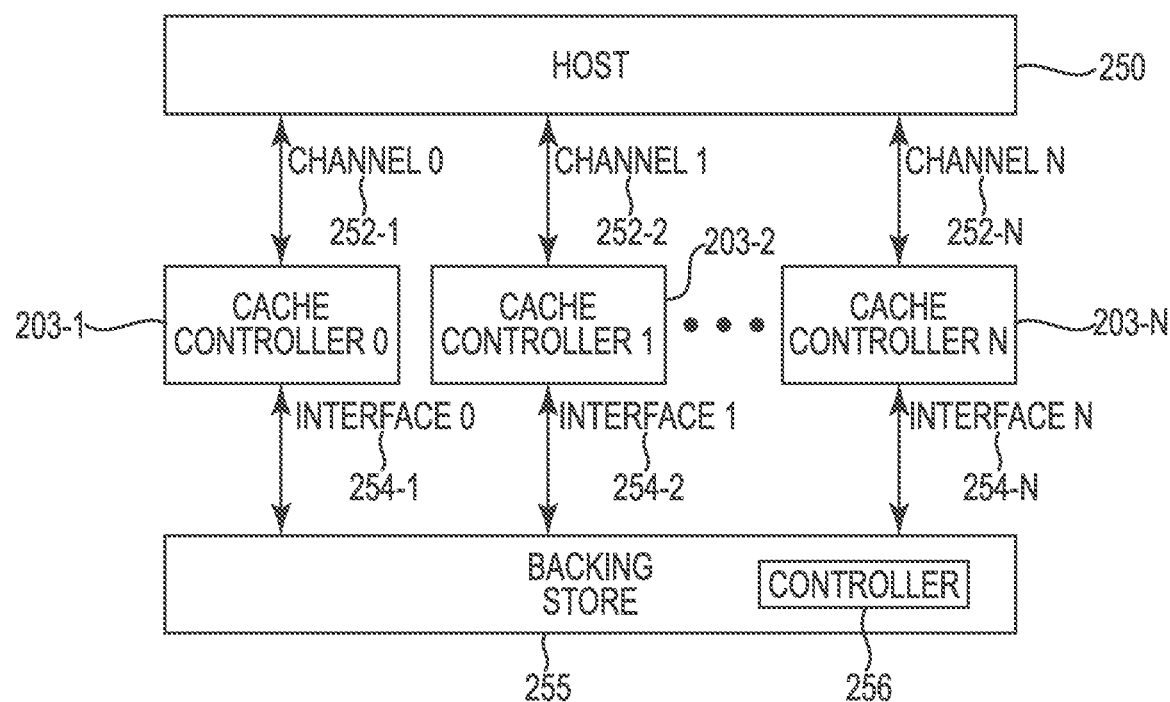
FIG. 2 is an example system that includes a memory device having a controller for interleaved cache prefetching in accordance with some embodiments of the present disclosure.

FIG. 2 is an example system that includes a memory device (e.g., backing store 255) having a controller 256 for interleaved cache prefetching in accordance with some embodiments of the present disclosure. Each cache controller 203-1, 203-2, . . . , 203-N can control data movement between a cache device (e.g., within host 250) and the backing store 255. In some examples, the backing store 255 is analogous to the memory device 130 and/or memory device 140 of FIG. 1. As shown in FIG. 2, data can be spread over the channels 252-1, 252-2, . . . , 252-N, with each channel 252-1, 252-2, . . . , 252-N having a cache controller 203-1, 203-2, . . . , 203-N, which may be a media type that can be accessed within a threshold time period such as static random-access memory (SRAM). While FIG. 2 illustrates a particular arrangement, embodiments are not limited to the arrangement of cache controllers, interfaces, channels, etc. illustrated in FIG. 2. Other arrangements may be used of interleaved cache prefetching in accordance with the present disclosure.

In some approaches, a controller 256 is not included in the backing store 255, and a cache device, for instance within the host 250, can store data that can be accessed within that threshold period of time if a request comes in channel 0 252-1, for instance. If the data is not present in the cache device, the backing store 255 is accessed through a different interface (e.g., interface 254-2, . . . 254-N), and because the backing store 255 may be a slower media, a performance penalty my result. In such approaches that include multi-channel configurations, interleaving may be used, such that different channels cover different bytes. For instance, data bytes 0-64 may be on channel 0 252-1, data bytes 65-128 on channel 1 252-2, etc. Other arrangements may also be used in other approaches. In order to access data sequentially in such approaches, each channel may be accessed in a particular order.

In such approaches, prefetch can occur only when a particular address is prefetched. This can result in large prefetches, which can result in a higher risk of fetching incorrect or undesired data. In addition, a miss can result in addresses in incorrection locations, so when a host (e.g., host 250) looks for a particular address, it may not find that address.

In contrast, examples of the present disclosure can include a monitoring engine inside the backing store 255, such that if access is detected to a particular address (e.g., address 0), the backing store 255, and in particular, the controller 256 can identify that the particular address (e.g., address 0) should be accessed, and that other addresses may be needed in the future (e.g., address 64, address 128, etc.). For instance, some data from the backing store 255 can be pushed to the cache controllers 203-1, 203-2, . . . , 203-N, so when the host 250 attempts to access address 64 and looks to channel 1 252-2, the backing store 255 has already written that data into the cache controller 1 203-2 and made it accessible to the host 250.

In other approaches, prefetch is controlled by cache controllers attempting to fetch addresses for their associated cache, but the cache controllers may be unaware of how many cache controllers are present within a system. In contrast, examples of the present disclosure include a common backing store 255 with a controller 256 that is aware of the number of interfaces 254-1, 254-2, . . . , 254-N and can determine how to push particular data into different channels 252-1, 252-2, . . . , 252-N. For instance, a monitoring engine can be in charge of moving data from the backing store 255 to each cache controller 203-1, 203-2, . . . , 203-N. This can allow for prefetch at each channel 252-1, 252-2, . . . , 252-N to be stepped through instead of waiting for a particular channel's turn. Prefetch can be triggered ahead of time, for example.

In some embodiments, the controller 256 (e.g., a DMA controller) can be embedded in the backing store 255 such that a cache controller 203-1, 203-2, . . . , 203-N can trigger a prefetch into a different cache controller 203-1, 203-2, . . . , 203-N. Each one of the cache devices can be located on an associated one of a plurality of interleaved channels 252-1, 252-2, . . . , 252-N between the host 250 (e.g., host transform, central processing unit, etc.) and the memory device (e.g., backing store 255). For instance, cache controller 203-1 can trigger a prefetch into cache controller 203-2. In such an example, a controller of the host 250 can provide a request, which can be routed to the cache controller 203-1. The cache controller 203-1 can include logic that can trigger a prefetch from the backing store 255. The cache controller 203-1 can send a message to the controller 256 in the backing store 255 through the interface 254-1. This message can include source addresses to be prefetched from the backing store 255. Upon receipt of the message, the controller 256 can initiate DMA transfers from the backing store 255 to the appropriate cache controller 203-2, . . . , 203-N. Similar examples include cache controllers 203-2, . . . , 203-N sending messages to the controller 256 via interfaces 254-2, . . . , 254-N.

In such embodiments, the prefetch may not be limited to cache controller 203-1, but the overall memory system can benefit from prefetch into the other cache controllers 203-2, . . . , 203-N. This can improve overall system performance by increasing cache hit rate and reducing read latency. In some embodiments, the prefetching and/or messages can be monitored by a memory sub-system prefetching component, such as the prefetching component 113 illustrated in FIG. 1.

In some embodiments, the backing store 255 can include a monitoring engine to track which addresses are accessed by each one of the cache controllers 203-1, 203-2, . . . , 203-N. The monitoring engine can analyze traffic coming in from one of the cache controllers 203-1, 203-2, . . . , 203-N, and can detect access patterns and anticipate future accesses from other cache controllers 203-1, 203-2, . . . , 203-N, either by prefetching the data into a local, faster buffer in the backing store 255, or by pushing data into another cache controller 203-1, 203-2, . . . , 203-N. Such examples can reduce read request latency of requests received at the backing store 255.

In some embodiments, triggering prefetch can include logic inside the backing store controller 256 keeping track of addresses and determining to push data into particular cache controllers 203-1, 203-2, . . . , 203-N, as noted above. Another option can include one or more cache controllers 203-1, 203-2, . . . , 203-N having prefetch logic to send messages to the backing store 255 to a monitoring engine or the controller 256. The backing store 255 can act as a data mover to push data (e.g., addresses) as desired. For example, the host 250 may provide information to the a cache controller 203-1, 203-2, . . . , 203-N including an overall architecture of a system, which cache controller within the system is its, how many cache controllers are available, etc., and with this information, firmware within the cache controller 203-1, 203-2, . . . , 203-N can make prefetching decisions. Put another way, in the former example, decision making occurs in the backing store 255, wherein the latter example includes decision making in the cache controllers 203-1, 203-2, . . . , 203-N, for instance using firmware running on the cache controllers 203-1, 203-2, . . . , 203-N.

Although the example illustrated in FIG. 2 illustrates a particular prefetch logic approach, examples are not so limited. Other prefetch approaches may be used in accordance with the backing store 255, monitoring engine, and/or controller 256 receiving an indication to prefetch data and pushing it to a cache controller such as cache controllers 203-1, 203-2, . . . , 203-N. For instance, the channels 252-1, 252-2, . . . , 252-N may be NVDIMM channels with the cache controllers 203-1, 203-2, . . . , 203-N being on a backside of NVDIMMs. In other examples, PCIe or compute express link (CXL) interfaces 254-1, 254-2, . . . , 254-N may be present, and/or the cache may be DRAM. In some instances, the cache is any memory type faster than or equal to the backing store 255 and in some instances may be the same memory type (e.g., in different form factors). Other example configurations may be utilized.

Figure 3:
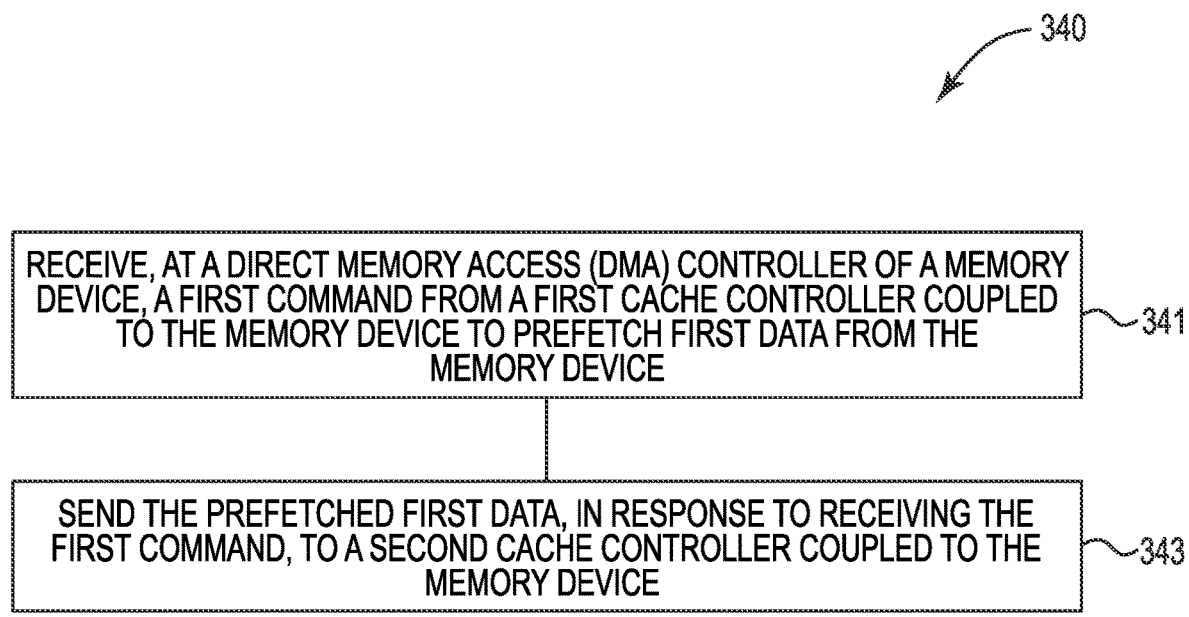
FIG. 3 is a flow diagram corresponding to a method for interleaved cache prefetching in accordance with some embodiments of the present disclosure.

FIG. 3 is flow diagram corresponding to a method 340 for interleaved cache prefetching in accordance with some embodiments of the present disclosure. The method 340 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 340 is performed by the prefetching component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 341, a first command from a first cache controller coupled to a memory device can be received at a DMA controller of the memory device to prefetch first data from the memory device. In some embodiments, the memory device, the DMA controller, and the first and the second cache controllers can be part of a memory sub-system analogous to the memory sub-system 110 illustrated in FIG. 1.

At operation 343, the prefetched data can be sent, in response to receiving the first command, to a second cache controller coupled to the memory device. For instance, the prefetched first data (e.g., data prefetched from the memory device in response to the first command) can be sent to the second cache controller via a memory device interface. The prefetched first data, in some examples, can be sent to the second cache controller based on a source address to be prefetched from the memory device. The source address can be included in the command.

In some examples, a second command can be received from a second cache controller coupled to the memory device to prefetch second data from the memory device, and the prefetched second data can be sent, in response to receiving the second command, to a third cache controller coupled to the memory device.

The prefetched first data can be sent to the second cache controller coupled to the memory device in response to the prefetched first data having a source address associated with the second cache controller and/or the source address not being associated with the first (or another) cache controller.

Figure 4:
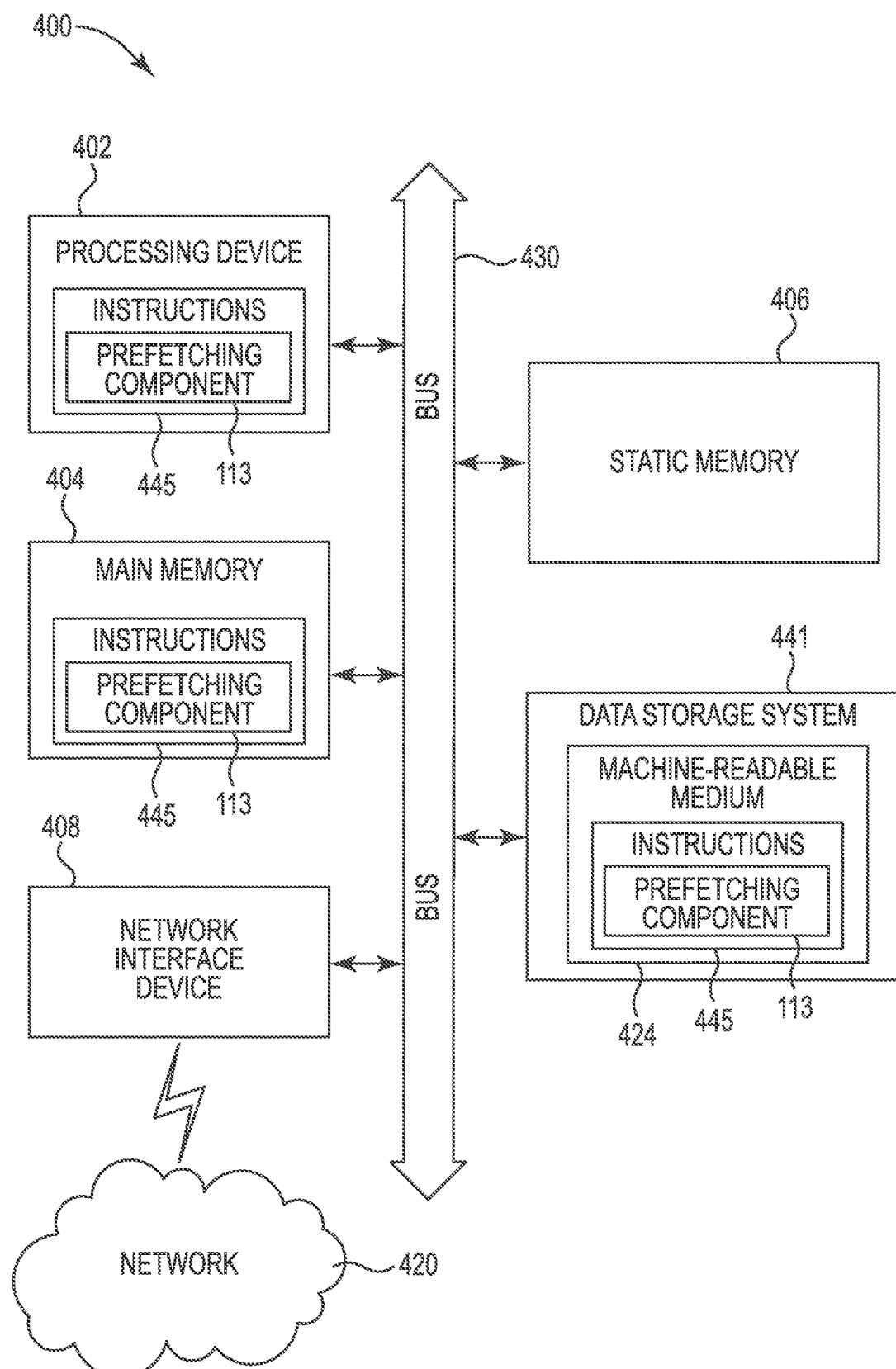
FIG. 4 is a block diagram of an example computer system in which embodiments of the present disclosure may operate.

FIG. 4 is a block diagram of an example computer system 400 in which embodiments of the present disclosure may operate. For example, FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the prefetching component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, SRAM, etc.), and a data storage system 418, which communicate with each other via a bus 430.

The processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to a prefetching component (e.g., the prefetching component 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

The invention claimed is:

1. A method, comprising:
   tracking, at a direct memory access (DMA) controller of a memory device, which source addresses are accessed by which cache controllers of a number of cache controllers;
   detecting access patterns of the number of cache controllers based on the tracked source addresses;
   anticipating future source address access based on the detected access patterns by prefetching associated data into a local buffer in the memory device; and
   sending prefetched data from a first cache controller of the number of cache controllers to a second cache controller of the number of cache controllers based on the anticipated future source address access.

2. The method of claim 1, comprising anticipating future source address access by sending the associated data into a particular cache controller of the number of cache controllers.

3. The method of claim 1, comprising receiving, at the DMA controller, a first command from the first cache controller to prefetch first data from the memory device.

4. The method of claim 3, comprising:
   receiving a read command requesting data from a third cache controller of the number of cache controllers; and
   determining which cache device of a plurality of cache devices to send the first command based on the read command.

5. The method of claim 3, further comprising:
   receiving a second command from the second cache controller coupled to the memory device to prefetch second data from the memory device; and
   sending the prefetched second data, in response to receiving the second command, to a third cache controller of the number of cache controllers coupled to the memory device.

6. The method of claim 3, further comprising sending the prefetched first data to the second cache controller coupled to the memory device in response to the prefetched first data having a source address associated with the second cache controller.

7. A system, comprising:
a memory device including a direct memory access (DMA) controller;
a number of cache devices coupled to the memory device;
a number of cache controllers coupled to the memory device;
a local buffer; and
a monitoring engine configured to:
track which source addresses are accessed by which of the number of cache controllers;
detect access patterns of the number of cache controllers based on the tracked source addresses; and
anticipate future source address access based on the detected access patterns by prefetching associated data into the local buffer.

8. The system of claim 7, further comprising the monitoring engine configured to anticipate future source address access by sending the associated data into a particular cache controller of the number of cache controllers.

9. The system of claim 7, further comprising the memory device receiving commands from the number of cache controllers for a prefetch operation.

10. The system of claim 7, further comprising a first cache controller of the number of cache controllers sending prefetched first data to a second cache controller of the number of cache controllers via a memory device interface.

11. The system of claim 10, further comprising the first cache controller sending the prefetched first data to the second cache controller based on a source address to be prefetched from the memory device.

12. The system of claim 7, wherein each one of the number of cache controllers is located on an associated one of the number of cache devices.

13. The system of claim 7, wherein each of the number of cache devices is located on an associated one of a plurality of interleaved channels between a host device and the memory device.

14. The system of claim 9, wherein each of the number of cache devices is coupled to the host device and the memory device via the associated interleaved channel.

15. The system of claim 7, wherein:
the DMA controller sends data to any one of the number of cache devices;
the data comprises sequential data; and
the number of cache controllers send commands in response to a request to process the sequential data.

16. An apparatus, comprising:
a number of cache controllers coupled to a memory device and configured to send commands to the memory device;
the memory device coupled to a plurality of cache devices and comprising:
a monitoring engine configured to:
track which source addresses are accessed by which of the number of cache controllers;
detect access patterns of the number of cache controllers based on the tracked source addresses;
anticipate future source address access based on the detected access patterns by prefetching associated data into a local buffer of the memory device.

17. The apparatus of claim 16, further comprising the monitoring engine configured to anticipate future source address access by sending associated data into a particular cache controller of the number of cache controllers.

18. The apparatus of claim 16, further comprising the monitoring engine configured to:
determine to perform a prefetch operation; and
determine which cache device of the plurality of cache devices to send a prefetch command.

19. The apparatus of claim 18, further comprising a direct memory access (DMA) controller configured to send prefetched data to a particular cache controller of the number of cache controllers, wherein the particular cache controller is associated with the determined cache device.

20. The apparatus of claim 17, wherein the monitoring engine is configured to:
track source addresses accessed by the cache controller; and
detect source address access patterns based on the tracked source addresses.

\* \* \* \* \*